United States Patent

Chakrabarti et al.

[15] 3,681,332

[45] Aug. 1, 1972

[54] DIHALO-S-TRIAZINE COMPOUNDS

[72] Inventors: Jiban Kumar Chakrabarti, Camberley; Alec Todd, Wokingham, both of England

[73] Assignee: Lilly Industries Limited, London, England

[22] Filed: April 13, 1971

[21] Appl. No.: 133,702

[52] U.S. Cl. ............................. 260/248 CS, 424/249
[51] Int. Cl. .................................................. C07d 55/48
[58] Field of Search ................................ 260/248 CS

[56] References Cited
UNITED STATES PATENTS 3,259,627  7/1966  Duennenberger et al. ...260/248

*Primary Examiner*—John M. Ford
*Attorney*—Everet F. Smith and Walter E. Buting

[57] ABSTRACT

2-(Heteroaryl substituted)-4,6-di-halo-s-triazines are useful as pesticides, being active in controlling fungi, bacteria, viruses and insects which attack plants, and may be prepared by halogenation of the corresponding 4,6-dioxo compounds or by reaction of a cyanuric halide with a heteroaromatic compound.

6 Claims, No Drawings

DIHALO-S-TRIAZINE COMPOUNDS

This invention relates to certain di-halo-s-triazine derivatives which are useful as plant pesticides, to pesticidal compositions containing said derivatives and to their use in protecting economically important plant life from attack by pests. By the term "pests" as used herein, we mean to include fungi, bacteria, viruses, insects and the like which cause destruction or deterioration of valuable plate life whilst the term "pesticide" is intended to embrace partial and total eradication of such pests as well as prevention of attack by such pests.

According therefore to a first aspect of the present invention, there is provided a method of treating plants susceptible to attack by pests which comprises applying to said plants a pesticidal amount of a di-halo-s-triazine of the formula:

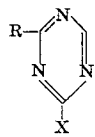

wherein X is halogen, preferably chlorine or bromine, and R is a mono- or bi-cyclic heteroaromatic group linked through a carbon atom to the triazine ring, said group being selected from thienyl, furyl, pyrrolyl, benzothienyl, benzofuryl and indolyl and being optionally substituted by one or more lower alkyl, lower alkenyl, hydroxy(lower)alkyl, carboxy(lower)alkyl, lower alkoxy, lower acyl, phenyl, phenyl(lower)alkyl, nitro, amino, halogen or, in the case where the heteroaromatic group is thienyl, by a 2-chloro-4-thienyl substituent.

The term "lower" in qualifying various groups is used herein to mean those groups containing up to six carbon atoms.

In accordance with a feature of the present invention, a sub-genus of compounds of formula I which is preferred for use in the present invention is the group in which R is selected from the following structures:

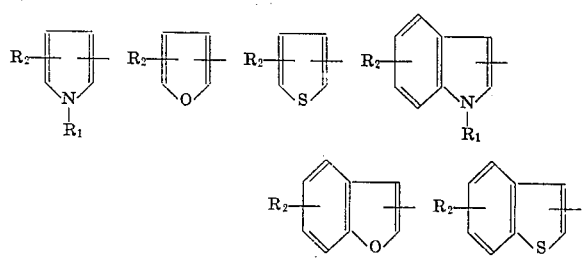

wherein $R_1$ is hydrogen, $C_{1-4}$ alkyl, vinyl, allyl, hydroxymethyl, hydroxyethyl, carboxymethyl, carboxyethyl, phenyl, benzyl or phenethyl and $R_2$ is hydrogen, $C_{1-4}$ alkyl, $C_{1-4}$ alkoxy, $C_{1-4}$ acyl, phenyl, nitro, amino, chlorine or bromine. Within that sub-genus, the compounds in which R is an optionally substituted pyrrolyl or indolyl group are especially valuable for their broad-spectrum fungicidal and bactericidal action.

In carrying out the method of the present invention, the compounds of formula I may be applied to the foliage of crops and plants and/or to the soil or water in which the crops or plants are growing. The compounds will normally be applied in the form of pesticidal compositions.

According therefore to a second aspect of the present invention, there is provided a pesticidal composition comprising the active ingredient in association with a non-phytotoxic diluent or carrier material and a process for preparing such pesticidal compositions comprising mixing a pesticidally-active ingredient of formula I with said diluent or carrier material. The latter may be, for example, one or more of water, alcohols, glycols, glycol-ethers, petroleum distillates and various dispersion media such as surfactants, emulsifiers and finely divided inert solids. The concentration of the di-halo-s-triazines in these compositions will vary depending on whether the composition is to be used directly as a dust or is intended as an emulsifiable concentrate or wettable powder designed to be subsequently diluted for example with water prior to use.

It will of course be appreciated that in the case of compositions comprising an active ingredient of formula I which is a known compound, we do not include within the composition aspect of the invention mere solutions of the active ingredient in water alone or in the common recrystallization media such as dioxan/water or ethanol/water. However, such solutions, when also containing emulsifying agents or other additives such as antifoaming agents or thickening agents, do form a part of this invention, as do the concentrate compositions hereinafter described.

Since in use the compounds will normally be applied to infected or susceptible plants as compositions containing from about five to 2000 p.p.m., preferably from about 200 to 1000 p.p.m., of the active ingredient, it is normally convenient for ease of formulation, storage, package etc., to formulate the active ingredient as a liquid or solid concentrate composition.

Liquid concentrates may be prepared by dissolving, dispersing or suspending from 0.1 to 30 percent of the active ingredient in water or a suitable water-miscible solvent such as, for example, suitable aromatic, aliphatic or cyclo-aliphatic hydrocarbons, ketones or alcohols to which may be added an emulsifying agent, for example a nonionic or ionic type or blend such as condensation products or alkylene oxides with phenols and organic acids, polyoxyethylene derivatives of sorbitan esters, complex ether-alcohols and the like.

Solid concentrate mixtures may be prepared by incorporating from five to 90 percent of the di-halo-s-triazine derivative in a finely divided solid carrier such as bentonite, fuller's earth, diatomaceous earth, hydrated silica, diatomaceous silica, kaolin, expanded mica, attapulgite, talc, chalk and the like. Such concentrates may be formulated for direct use or may, if desired, be diluted with additional inert solid carriers to produce dusting powders. Alternatively dispersing and/or wetting agents may be incorporated to form wettable powder concentrates which subsequently may be dispersed in water or in other aqueous carriers to form spray compositions. Suitable wetting and emulsifying agents include sodium lauryl sulphate, sodium lignosulphate and other suitable nonionic and anionic surfactants or blends thereof.

The di-halo-s-triazine derivatives of the invention may also be incorporated in tablets, pellets, capsules or formulated as aerosols or sprays to ensure that the pesticidal action can be obtained at the locus of the disease.

The compounds of formula I have, as stated earlier, been found to be useful as pesticides. In particular, the compounds of the present invention have shown activity against various phytopathogenic fungi such as *Alternaria tenuis, Botrytis cinerea, B. viticola, Colletotrichum atramentarium, C. coffeanum, C. lagenarium, Penicillium expansum, Peronospora sp., Piricularia oryzae, Phytophthora infestans, Uromyces appendiculatus* and *Venturia sp.* The compounds are also active for the control of Maize dwarf mosaic virus, Bean mosaic virus, bacterial blight, bacterial wilt, Crown gall as well as being useful as insecticides, in particular giving good contact control of 2-Spotted Spider Mite.

The fungicidal action of the di-halo-s-triazines of the present invention may be demonstrated by reference to the test results set out in Table I below, these results being obtained with representative compounds of the invention in standard foliar fungicide tests. As shown, the compounds display significant fungicidal activity against the diseases tomato late blight, anthracnose or cucumber, rice blast, *Helminthosporum* leaf spot of barley and grey mould of grapes.

The test procedures used are described in the following paragraphs. In each test, the compound was formulated as an emulsion or solution at a concentration of 400 p.p.m. and applied as a spray.

Rice blast. The aqueous emulsion of the test compound was applied to all leaf surfaces of 14-day-old rice plants of the NATO variety and allowed to dry. The foliage was then inoculated with a water suspension of conidia (*Piricularia oryzae* race N-1) by means of a sprayer. The treated plants were placed in a moist chamber at 65° F. for 40 hours before being returned to the greenhouse. Eight days thereafter, the symptoms of the blast disease were observed and compared with control plants.

Cucumber Anthracnose. The aqueous emulsion of the test compound was sprayed on all leaf surfaces of 15-day-old cucumber plants (Green Prolific variety) and allowed to dry. The foliage was then inoculated with a water suspension of conidia (*Collectrotrichum lagenarium*) by means of a sprayer.

Following inoculation, the treated plants were placed in a moist chamber maintained at 75° F. for 40 hours after which the plants were returned to the greenhouse. On the 10th day following treatment and inoculation the disease symptoms were observed and recorded and compared with control plants.

Tomato Late Blight. The aqueous emulsion of the test compound was sprayed on all leaf surfaces of 28-day-old tomato plants of the Bonnie Best variety and allowed to dry. The plants were then inoculated with a water suspension of fungal propagules (*Phytophthora infestans*) by means of a sprayer. The plants were placed in a moist chamber maintained at a temperature of 65° F. for 24 hours after which they were returned to the greenhouse. Three days thereafter, the symptoms of late blight disease were observed and recorded and compared with control plants.

*Helminthosporum* Leaf Spot of Barley. The aqueous emulsion of the test compound was sprayed on 6-day-old barley seedlings four to five inches tall of the Larker variety and allowed to dry. The plants were then inoculated with an aqueous suspension of spores of *Helminthosporum sativum* and placed in a moist chamber at 65° F. for 48 hours. Two days later the plants were removed from the chamber and placed in the greenhouse. Four days thereafter, or 12 days from planting, the symptoms of leaf spot disease were observed and recorded and the results were compared with control plants. Grey Mould of Grapes. Grape clusters (four berries per cluster) of Red Emperor grapes were sterilized with a 1.5 percent solution of sodium hypochlorite, rinsed with distilled water and allowed to dry. The clusters were then burnt out in alcohol to ensure complete sterilization and to predispose the berries to infection. The test compound was then applied by spray as a one percent solution in acetone/ethanol and the berries dried. A spore suspension of *Botrytis cinerea* was then applied evenly over the clusters and, after 48 hours incubation at 75° F., the disease symptoms were noted and compared with controls.

TABLE I

| Compound | | Plant Disease activity | | | | |
|---|---|---|---|---|---|---|
| 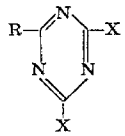 | | Late Blight | Anthracnose | Rice Blast | Leaf Spot | Grey Mould |
| R | X | | | | | |
|  | Cl | 4+ | 5 | 4+ | 1 | 5 |
|  | Br | 3 | 4+ | 4+ | 1 | – |
|  | Cl | 1 | 3 | 3 | 1 | 2 |
|  | Cl | 1 | 2 | 1 | – | 3 |
|  | Cl | – | – | – | – | 3 |

| R | X | | | | | |
|---|---|---|---|---|---|---|
| 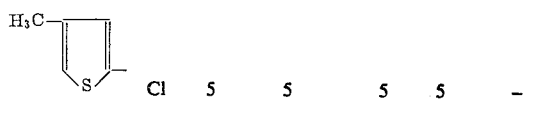 | Cl | 5 | 5 | 5 | 5 | – |
|  | Cl | – | – | 3 | – | – |
|  | Cl | 1 | 5 | 1 | – | 2 |
|  | Cl | 5 | 5 | 5 | – | 1 |
| 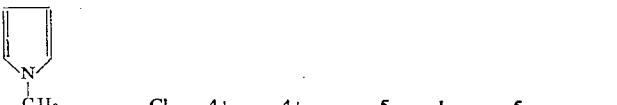 | Cl | 4+ | 4+ | 5 | 1 | 5 |
|  | Cl | 5 | 5 | 5 | 4+ | – |
|  | Cl | 4 | 4+ | 5 | – | 1 |
|  | Cl | 4 | 3 | 4 | – | – |
|  | Cl | 3 | 1 | 5 | – | 2 |

In the above Table, activity ratings have the following meaning:
- Not tested
- 1 No control
- 2 Slight control
- 3 Moderate control
- 4 Good control
- 5 Complete control The compounds of formula I above in which R is thienyl or furyl have been generally described in U.S. Pat. specification No. 5,407,201 as intermediates in the preparation of compounds of the formula:

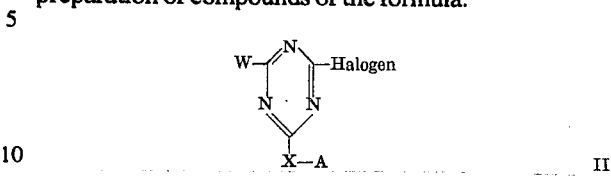

II wherein A is an aromatic ring system containing at least one ring nitrogen atom, X is a divalent hetero-atom bridge member chosen from -O-, -S-, -NH- and -N lower alkyl-, and W represents inter alia a monovalent heterocyclic residue linked through a carbon atom with the triazine ring and containing no more than 20 carbon atoms. The only specific examples given in the specification of W representing such a heterocyclic residue are unsubstituted furyl and thienyl. Although the compounds of formula II are said to be fungicides and bactericides, no such properties are attributed to or even suggested for the intermediates wherein the group -X-A in formula II is a halogen atom. Indeed it is stated quite categorically in column 3 of the said U.S. specification that the structural element:

$$\begin{array}{c}\phantom{X}\\-\text{C}\end{array}\!\!\diagdown\!\!\begin{array}{c}\text{N}\\\text{N}\end{array}\!\!\text{—Halogen}$$

III is essential to the invention.

Certain of the compounds of formula I in which R is thienyl or furyl are also described in French Pat. specification No. 1,387,435 as intermediates in the preparation of certain hydroxyaryl-s-triazines. The intermediates shown in the French Specification have the formula:

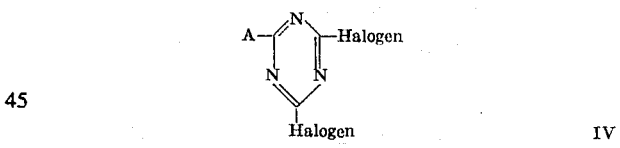

IV wherein A is a furyl or thienyl residue of formula:

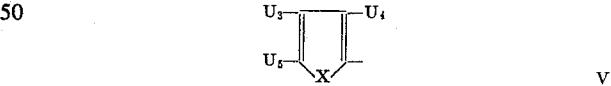

V

In which X is oxygen or sulphur and $U_3$, $U_4$ and $U_5$ represent the same or different hydrogen, $C_{1-8}$ alkyl or phenyl. The hydroxyaryl-s-triazine products disclosed in the French specification are said to be useful for protecting organic materials against the effects of heat, air and ultra-violet radiation. There is no suggestion in the specification that the intermediates of formula IV have any utility other than in the preparation of the hydroxyaryl end products and in particular there is no disclosure or suggestion that these intermediates possess useful pesticidal activity as has now been discovered by the Applicants.

From the above described prior art, it can be seen that the majority of the compounds of formula I above in which R is substituted thienyl or furyl have not been specifically described or suggested in the prior art nor has their pesticidal action been envisaged. They are accordingly novel and non-obvious compounds and form a part of this invention.

According therefore to a third aspect of the present invention, there are provided novel compounds of the formula:

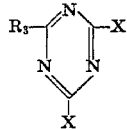

VI wherein X is a halogen atom, preferably chlorine or bromine, and $R_3$ is a heteroaromatic group linked through a carbon atom with triazine ring, $R_3$ being either:

a. a substituted furyl group in which at least one substituent is selected from lower alkoxy, lower acyl, nitro, amino or halogen;

b. a substituted thienyl group in which at least one substituent is selected from lower alkoxy, lower acyl, nitro, amino, halogen, or a 2-chloro-4-thienyl group;

c. a benzothienyl or benzofuryl group optionally substituted by one or more lower alkyl, lower alkoxy, lower acyl, nitro, amino or halogen;

or d. a pyrrolyl or indolyl group optionally substituted on the nitrogen by lower alkyl, lower alkenyl, hydroxy(lower)alkyl, carboxy(lower)alkyl, or phenyl(lower)alkyl and optionally substituted at one or more ring carbon atoms by lower alkyl, lower alkoxy, lower acyl, phenyl, nitro, amino or halogen.

In respect of groups (c) and (d), the aforementioned prior art is, of course, completely silent both as to the generic structures involved and the species falling within that genus. As mentioned previously, compounds of group (d) form an especially valuable part of this invention in view of their broad-spectrum of activity, in particular those compounds of formula VI wherein $R_3$ has the structure:

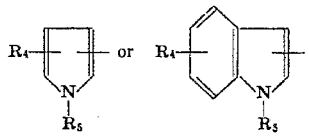

where $R_4$ is hydrogen, methyl, methoxy, acetyl, nitro, amino, chlorine or bromine, and $R_5$ is hydrogen, $C_{1-4}$ alkyl, vinyl, hydroxyethyl, carboxyethyl, benzyl or phenethyl.

According to a fourth aspect of the present invention, the novel compounds of this invention may be prepared by a method analogous to that described in French specification No. 1,387,435, i.e., by halogenation of the corresponding dioxo compounds. The latter may be prepared by reacting an appropriate acid derivative of the heteroaromatic compound of formula R-H with a biguanide to form the corresponding guanamine which is hydrolyzed by means of an acid to yield the dioxo compound. Alternatively the dioxo compound may be obtained by cyclizing under the influence of an alkali the appropriate acyl biuret of formula $RCONHCONHCONH_2$, the latter being obtained either by direct acylation of biuret or by reaction of an acid chloride of formula RCOCl with dicyandimide followed by acid hydrolysis of the resultant acyl cyanoguanidine. Suitable halogenating agents of use for the halogenation of the dioxo compound include phosphorus pentachloride, phosphorus trichloride, phosphorus tribromide, bromine, phosphoryl chloride, phosphoryl bromide, phosphorus tri-iodide and suitable mixtures thereof.

It can be seen that use of the known method requires a time-consuming, multi-stage process to prepare the dioxo intermediates. In accordance therefore with a fifth aspect of the present invention, the aforementioned multi-stage process may be avoided by the use of a new and improved one-stage synthesis for preparing both the novel and known compounds of the invention characterized in that a cyanuric halide is reacted with a heteroaromatic compound of formula R-H or a metallated derivative thereof. Where a non-metallated compound is used, it is normally desirable to carry out the reaction in the presence of a Friedel-Crafts catalyst such as aluminum chloride. However, where the heteroaromatic compound is an N-substituted pyrrole, no such catalyst is necessary since the reaction proceeds smoothly merely by heating the two reactants in a suitable solvent such as benzene.

The metallated compounds referred to above may be prepared by reacting the appropriate heteroaromatic compound with a suitable metallating agent such as magnesium, a suitable Grignard reagent or an alkyl lithium compound. Advantageously the metallated derivative thus prepared is slowly added with stirring to a solution of the cyanuric halide in a suitable solvent at low temperature, preferably between 0° and 5° C. Thereafter stirring is continued usually for from ½ to four hours at between 0° and 25° C. whereupon the reaction is either complete or is completed by refluxing for a short period of up to three hours or by leaving the reaction mixture to stand at about 20° to 25° C. for up to 24 hours.

Wherein the above described methods a nitro substituted heteroaromatic group is required, this may be obtained by direct nitration of the corresponding dihalo-s-triazine and indeed must be so obtained in the case of the new an improved method of the present invention. In some cases, this nitration may cause hydrolysis to the corresponding dioxo compounds but, as will be appreciated from the above description, these may readily be re-halogenated. It will also be apparent that this hydrolysis and re-halogenation provides a simple method of converting one halogen to another. Thus, for example, a dichloro-s-triazine may be hydrolyzed and then brominated using, for example, a mixture of phosphorus tribromide and bromine to give the corresponding dibromo-s-triazine.

Exemplary of compounds which can be prepared by the foregoing methods and which are of use as pesticides in accordance with the present invention are:

2-(1'-phenylpyrrol-2'-yl)-4,6-dichloro-s-triazine
2-(5'-nitropyrrol-3'-yl)-4,6-dichloro-s-triazine
2-(1'-ethylpyrrol-2'-yl)-4,6-dibromo-s-triazine
2-(5'-methoxypyrrol-2'-yl)-4,6-dibromo-s-triazine
2-(pyrrol-2'-yl)-4,6-dichloro-s-triazine
2-(4-nitro-5-ethylthien-2'-yl)-4,6-dichloro-s-triazine 2-(5'-bromothien-2'-yl)-4,6-dichloro-s-triazine
2-(3'-methylbenzo[b]thien-2'-yl)-4,6-dichloro-s-triazine
2-(thien-2'-yl)-4,6-dichloro-s-triazine
2-(1',3'-dimethylpyrrol-2'-yl)-4,6-dichloro-s-triazine
2-(thien-3'-yl)-4,6-dichloro-s-triazine
2-(5'-nitroindol-2'-yl)-4,6-dibromo-s-triazine
2-(benzo[b]thien-2'-yl)-4,6-dibromo-s-triazine
2-(5'-acetylthien-2'-yl)-4,6-dibromo-s-triazine
2-(benzo[b]thien-3'-yl)-4,6-dibromo-s-triazine
2-(3'-methylthien-2'-yl)-4,6-dichloro-s-triazine
2-(indol-3'-yl)-4,6-dichloro-s-triazine
2-(benzo[b]fur-2'-yl)-4,6-dichloro-s-triazine
2-(5'-nitrofur-2'-yl)-4,6-dibromo-s-triazine
2-(1'-allylpyrrol-2'-yl)-4,6-dibromo-s-triazine
2-(5'-chloropyrrol-3'-yl)-4,6-dichloro-s-triazine
2-(1'methyl-5'-nitropyrrol-2'-yl)-4,6-dibromo-s-triazine
2-(5'-nitrothien-3'-yl)-4,6-dichloro-s-triazine
2-(5'-chloroindol-3'-yl)-4,6-dichloro-s-triazine
2-(5'-ethylbenzo[b]thien-3'-yl)-4,6-dichloro-s-triazine
2-(benzo[b]fur-2'-yl)-4,6-dichloro-s-triazine
2-(1'-benzylindol-3'-yl)-4,6-dichloro-s-triazine
2-(5',6'-dimethylbenzo[b]fur-2'-yl)-4,6-dichloro-s-triazine
2-(5'-nitrobenzo[b]thien-2'-yl)-4,6-dichloro-s-triazine
2-[5'-(2''-chlorothien-4''-yl)thien-2'-yl]-4,6-dibromo-s-triazine
2-(1'-phenylindol-3'-yl)-4,6-dibromo-s-triazine
2-(1'-phenethylpyrrol-2'-yl)-4,6-dichloro-s-triazine
2-(1'-n-butylpyrrol-3'-yl)-4,6-dichloro-s-triazine
2-(4'-bromothien-2'-yl)-4,6-dichloro-s-triazine
2-(5'-acetylpyrrol-2'-yl)-4,6-dichloro-s-triazine
2-(1'-methylpyrrol-2'-yl)-4,6-dichloro-s-triazine
2-(pyrrol-3'-yl)-4,6-dibromo-s-triazine
2-(1'-phneylindol-2'-yl)-4,6-dichloro-s-triazine
2-(1'-t-butylpyrrol-2'-yl)-4,6-dichloro-s-triazine
2-(1'-vinylpyrrol-2'-yl)-4,6-dichloro-s-triazine
2-(1'-isopropyl-5'-nitropyrrol-2'-yl)-4,6-dichloro-s-triazine
2-(1'-β-hydroxyethylpyrrol-3'-yl)-4,6-dibromo-s-triazine
2-(1'-carboxymethylpyrrol-2'-yl)-4,6-dichloro-s-triazine The following Examples will further illustrate the preparation of the novel compounds of this invention:

EXAMPLE 1

2-(5'-Nitrofur-2'-yl)-4,6-dichloro-s-triazine 2-(5'-Nitrofur-2'-yl)-4,6-dioxo-s-triazine (0.13 g.) was heated under reflux with $PCl_5$ (0.3 g.) and $POCl_3$ (0.6 g.) for 24 hours. The liquid obtained was allowed to cool to room temperature, poured onto crushed ice (10 g.) and stirred for 30 minutes. The solid was collected on a filter, dried and extracted into ether. The ether was evaporated off and the solid recrystallized from carbon tetrachloride: petroleum ether (1:2) to give the desired product, m.p. 166° – 168° C. The dioxo intermediate was prepared as follows: A mixture dicyandiamide 22.6 g., 0.27 mole) and KOH pellets (28 g., 0.425 mole) (Assay 85 percent pure) was vigorously stirred in acetone (200 ml.) at 15° – 20° C. for one hour and then at 0° – 5° C. for another hour. To this cold suspension was added dropwise 2-furoyl chloride (27.4 g., 0.21 mole) in acetone (50 ml.); the mixture gradually turned thick, more acetone (150 ml.) was added to facilitate stirring for a period of three hours. The mixture was cooled in the fridge overnight, buff colored suspension was diluted with water (750 ml.); clear solution was acidified with glacial acetic acid (20 ml.), the resulting precipitate was collected on a filter, washed with water and dried under vacuum (ca. 19 g.), which was heated under reflux in water (500 ml.) containing conc. HCl (25 conc. ml.) for one hour and left overnight; the needle shaped crystals separated, were collected on a filter, washed with cold water and dried under vacuum, crystallized from water, m.p. 204° – 206' C., yield 16 g.

The crystalline solid (12.5 g.) was heated at 60° – 65° C. in water (200 ml.) containing KOH (16 g.) for 16 hours. When cold, the solution was filtered and acidified with glacial acetic acid (20 ml.), the resulting white precipitate cooled in the fridge, and then collected on a filter, washed with five percent aqueous acetic acid (100 ml.), water (400 ml.) and dried under vacuum, 9 g.; crystallized from water, m.p. > 300° C.

Analysis: $C_7H_5N_3O_3$
Found: C, 46.21; H, 2.74; N, 23.28
Requires: C, 46.91; H, 2.81; N, 23.44%

The above compound (5 g.) was heated under reflux with $PCl_5$ (11.5 g.) and $POCl_3$ (30 ml.) for three hours, the mixture, on cooling, was poured into crushed ice (400 g.) and stirred for 30 minutes; the light brown solid was filtered, washed with water and dried, ca. 4.7 g. recrystallized from acetone, m.p. 104° C.

Analysis: $C_7H_3N_3OCl_2$
Found: C, 39.11; H, 1.59; N, 19.63; O, 7.65; Cl, 32.58
Requires: C, 38.92; H, 1.40; N, 19.44; O, 7.41; Cl, 32.82%

The resultant 2-(fur-2'-yl)-4,6-dichloro-s-triazine (0.5 g.) was added portionwise to a mixture of 3:1 conc. $H_2SO_4$ and conc. $HNO_3$ (3 ml.) at 0° – 5° C., the reaction mixture was stirred for five minutes and poured onto crushed ice (10 g.), yielding 2-(5'-nitrofur-2'-yl)-4,6-dioxo-s-triazine, which was filtered and dried in vacuum, 0.13 g. This product may also be obtained by hydrolysis of the dichloro compound under reflux with ethanol and concentrated sulphuric acid, followed by nitration of the resultant 2-(fur-2'-yl)-4,6-dioxo-s-triazine.

EXAMPLE 2

2-(4'-Nitrothien-2'-yl)-4,6-dichloro-s-triazine 2-(4'-Nitrothien-2'-yl)-4,6dioxo-s-triazine (0.5 g.) was chlorinated by the method of Example 1 to yield the desired product, m.p. 186° – 187° C. after recrystallization from 10:1 hexane:chloroform mixture. The dioxo intermediate was prepared as follows:

A solution of sodium methoxide, prepared from Na (1.0 g., 0.04 g. atoms) in absolute methanol (20 ml.) was added to a suspension of biguanide sulphate $(C_2H_7N_5)_2 \cdot H_2SO_4$ (6.2 g., 0.02 mole) in methanol (30 ml.) followed by ethyl 4-nitrothien-2-yl-carboxylate (4.02 g., 0.02 mole) with stirring; the mixture was kept stirring for 48 hours, diluted with water, solid filtered, washed with water and dried under vacuum at 110° C.; 4.8 g., crystallized from dimethyl-formamide to give 2-(4'-nitrothien-2'-yl)-4,6-diamino-s-triazine. This, on hydrolysis with 90% $H_2SO_4$, afforded the corresponding dioxo intermediate.

EXAMPLE 3

By the method of Example 1, the following compounds of the invention were prepared by halogenation of the corresponding dioxo compounds, the latter being themselves prepared either by the method described in Example 1 or Example 2:

2-(5'-bromothien-2'-yl)-4,6-dichloro-s-triazine, m.p. 104° – 106° C.

2-(benzo[b]thien-2'-yl)-4,6-dichloro-s-triazine, m.p. 236° – 238° C.

2(benzo[b]thien-3'-yl)-4,6-dichloro-s-triazine, m.p. 198° – 200° C.

2-(1'-methylpyrrol-2'-yl)-4,6-dichloro-s-triazine, m.p. 157° C.

2-(pyrrol-2'-yl)-4,6-dichloro-s-triazine, m.p. 138° – 140° C.

2-(5'-methoxythien-2'-yl)-4,6-dichloro-s-triazine, m.p. 107° C.

2-(3'-methoxythien-2'-yl)-4,6-dichloro-s-triazine, m.p. 208° – 210° C.

2-(5'-acetylthien-2'-yl)-4,6-dichloro-s-triazine, m.p. 152° C.

2-(1'-ethylpyrrol-2'-yl)-4,6-dichloro-s-triazine, m.p. 115° C.

2-(1'-n-butylpyrrol-2'-yl)-4,6-dichloro-s-triazine, m.p. 44° – 46° C.

2-(1',5'-dimethylpyrrol-2'-yl)-4,6-dichloro-s-triazine, m.p. 170° C.

2-(1'-benzylpyrrol-2'-yl)-4,6-dichloro-s-triazine, m.p. 125° – 127° C.

2-(5'-methylpyrrol-2'-yl)-4,6-dichloro-s-triazine, m.p. 208° – 209° C.

2-(indol-3'-yl)-4,6-dichloro-s-triazine, m.p. 250° – 252° C.

2-(5'-ethyl-4'-nitrothien-2'-yl)-4,6-dichloro-s-triazine, m.p. 150° – 155° C.

2-(1'-methyl-4'-nitropyrrol-2'-yl)-4,6-dichloro-s-triazine, m.p. 179° C.

2-(5'-nitropyrrol-2'-yl)-4,6-dichloro-s-triazine, m.p. 170° – 173° C.

EXAMPLE 4

In addition to the methods for obtaining nitrated products described in Examples 1 and 2, the following method for direct nitration of a dichloro compound may be employed with certain compounds of the invention:

To a suspension of 2-(pyrrol-2'-yl)-4,6-dichloro-s-triazine (2.15 g.) in acetic anhydride (12.5 ml.) cooled in an ice bath, was added dropwise with stirring a mixture of fuming nitric acid (0.8 g.) in acetic anhydride (2 ml.) at a temperature of 5° – 10° C. The mixture was stirred for five minutes, poured on to crushed ice and extracted with ether. The ether extract afforded a solid (1.8 g.) which on fractional crystallisatios from carbon tetrachloride yield (2-(5'-nitropyrrol-2'-yl)-4,6-dichloro-s-triazine, m.p. 170° – 173° C.

The following Examples will illustrate the new method invention by the applicants for preparing both the novel and known compounds of the invention.

EXAMPLE 5

2-(5'-Bromothien-2'-yl)-4,6-dichloro-s-triazine

Bromoethane (0.75 ml., 0.01 mole) was added dropwise to a stirred suspension of magnesium turnings (12.2 g., 0.05 g. atoms) in dry ether (50 ml.) under reflux. 2,5-Dibromothiophene (10 g., 0.041 mole) in dry ether (200 ml.) was added to the refluxing mixture over a period of eight hours, adding further magnesium (12.2 g., 0.05 g. atoms) in eight portions. The mixture was heated under reflux for a further six hours then, after cooling, the clear solution was decanted from the excess magnesium and added dropwise to a stirred solution of cyanuric chloride (3.7 g., 0.02 mole) in dry benzene (50 ml.) at 5°. After stirring for two hours at room temperature and three hours under reflux the mixture was evaporated to dryness under vacuum and the residue was extracted with petroleum spirit. Chromatography of the extract on a silica gel column, eluting with a mixture of benzene and petroleum spirit (1:4 by volume) gave, on evaporation of the eluate, a solid, which was crystallized from acetone-water and then from petroleum spirit to give pale yellow needles, m.p. 104° – 106° C.

EXAMPLE 6

2-(Thien-2'-yl)-4,6-dichloro-s-triazine

2-Bromothiophene (100 g., 0.61 mole) in dry ether (100 ml.) was added dropwise to a stirred suspension of magnesium turnings (15.2 g., 0.62 g. atoms) in dry ether (300 ml.) under reflux. The resulting dark solution was cooled and added dropwise over 30 minutes to a stirred solution of cyanuric chloride (73.6 g., 0.40 mole) in benzene (400 ml.) at 0° – 5° C. After stirring for a further one hour at room temperature the mixture was evaporated to dryness under vacuum and the residual brown solid was extracted with hot petroleum spirit. On cooling, the extract deposited pale yellow crystals (57.5 g.), m.p. 150° C.

EXAMPLE 7

2-(Pyrrol-2'-yl)-4,6-dichloro-s-triazine

To a cooled (ice-salt bath) solution of methyl magnesium bromide (0.05 mole) in dry ether (40 ml.) was added dropwise with stirring pyrrole (freshly distilled) (3.4 g., 0.05 mole); the mixture kept stirring for 15 minutes and then gradually added dropwise with stirring to an ice cold suspension of cyanuric chloride (6.1 g., 0.033 mole) in dry benzene (50 ml.) at 0° – 5° C. The mixture was stirred at this temperature for one hour and then left at 20° – 25° C. overnight and finally evaporated under vacuum at ordinary room temperature. The solid residue was extracted in a Soxhlet apparatus with petroleum ether (60° – 80° C.); on evaporation of the solvent greenish crystals appeared, which were recrystallized from petroleum ether (60° – 80°C.), ca. 3 g., m.p. 138° – 140° C.

EXAMPLE 8

2-(Thien-3'-yl)-4,6-dichloro-s-triazine

3-Bromothiophene (5 g., 0.0306 mole) in dry ether (35 ml.) was added dropwise to a stirred solution of n-butyl lithium (15.5 ml. of a 2.25M solution) in n-hexane at −70° C. under nitrogen cover. After stirring for a further 30 minutes at −70° C. the clear solution was added in small portions to a stirred solution of cyanuric chloride (5.0 g., 0.027 mole) in dry benzene (50 ml.) at 0° C. After stirring for a further 30 minutes at 0° C. and one hour at room temperature, the pale solid was removed by filtration and the filtrate was evaporated to dryness under vacuum. The residue was extracted with hot petroleum spirit and the extract was evaporated to dryness to give a pale solid which was recrystallized from acetone-water and then from petroleum spirit. Yield 2.3 g. m.p. 134°–136° C.

EXAMPLE 9

2-(Benzo[b]thien-2'-yl)-4,6-dichloro-s-triazine

Benzo[b]thiophene (20.1 g., 0.15 mole) in dry ether (100 ml.) was added dropwise to a stirred solution of n-butyl lithium (75 ml. of a 2M solution) in n-hexane at 40° C. under nitrogen cover. After 2½ hours, the resulting light yellow suspension was added dropwise to a stirred solution of cyanuric chloride (27.6 g., 0.15 mole) in dry benzene (100 ml.) and ether (50 ml.) under nitrogen at 0°–5° C. After stirring for 18 hours at room temperature, the solvent was removed under vacuum. The residue was extracted with hot hexane and sublimed in vacuo to give 0.4 g. of the desired product, m.p. 236°–238° C.

EXAMPLE 10

2-(Thien-2'-yl)-4,6-dichloro-s-triazine n-Butyl lithium (21.8 ml.) of a 2.2 M solution in hexane, and dry ether (10 ml.) was added quickly to a mixture of dry thiophene (4.2 g., 0.05 mole) and dry ether (10 ml.) under nitrogen. The whole was stirred vigorously for 25 minutes when butane was freely evolved. The reaction was completed by refluxing with stirring for a further 90 minutes.

The 2-thienyl lithium was so obtained as a straw colored slurry. It was cooled in ice-water and then added dropwise to a well-stirred suspension of cyanuric chloride (9.2 g., 0.05 mole) in dry benzene (25 ml.) whilst maintaining the temperature in the range 0° to 5° C. The resulting deep brown solution was stirred for 30 minutes at room temperature and left overnight.

The solvent was stripped off under reduced pressure and the solid obtained was extracted with ether. The solution was again evaporated to leave a solid which was dissolved in hot acetone, water mixture (3:1 vol.) and refluxed for about 20 minutes. The solution or suspension was concentrated to small volume in vacuo and kept at 0° C. overnight. The crystalline mass was filtered off, dried and extracted into ether. The ether was removed in vacuo and the solid recrystallized from carbon tetrachloride, petroleum ether mixture (1 vol. to 2 vols.) to yield 2.6 g. of colorless crystals, m.p. 151° C. It could be further purified by vacuum sublimation (at about 100°–120° C./0.05 mm.).

EXAMPLE 11

2-(Benzo[b]thien-3'-yl)-4,6-dichloro-s-triazine

Benzo[b]thiophene (13.4 g., 0.10 mole) in dry benzene (20 ml.) was added dropwise to a stirred solution of aluminum chloride (20 g., 0.15 mole) and cyanuric chloride (18.5 g., 0.10 mole) in benzene (200 ml.) and nitromethane (10 ml.). The dark mixture was heated at 40°–50° C. for four hours then poured onto a mixture of ice (300 g.), concentrated hydrochloric acid (30 ml.) and ethyl acetate (300 ml.). The solvent layer was washed with water, dried over sodium sulphate and evaporated to dryness under vacuum, to give a gum which was extracted with hot ether. Evaporation of the ether extract and crystallization of the residue from acetone-water and then from dichloromethane-petroleum spirit gave pale crystals, m.p. 198°–200° C.

EXAMPLE 12

2-[5'-(2''-Chlorothien-4''-yl)thien-2'-yl]-4,6-dichloro-s-triazine

2-Chlorothiophene (11.9 ml., 0.10 mole) in benzene (20 ml.) was added dropwise to a stirred solution of cyanuric chloride (9.5 g., 0.05 mole) and aluminum chloride (20 g., 0.15 mole) in benzene (200 ml.) and nitromethane (10 ml.). After stirring for 24 hours the dark mixture was poured onto a mixture of ice (300 g.) and conc. hydrochloric acid (30 ml.) and the mixture was extracted with ether. The extract was evaporated to dryness under vacuum and the residue was crystallized repeatedly from dioxane-water and from carbon tetrachloride to give bright orange crystals, m.p. 200° C.

EXAMPLE 13

2-(1'-Methylpyrrol-2'-yl)-4,6-dichloro-s-triazine

Equimolar proportions of N-methyl pyrrole and cyanuric chloride were refluxed in benzene overnight. The benzene was evaporated off and the product crystallized from acetonitrile to yield 2-(1'-methylpyrrol-2'-yl)-4,6-dichloro-s-triazine, m.p. 157° C. – yield 70 percent. Similarly other N-substituted pyrroles can be prepared.

EXAMPLE 14

2-(Thien-2'-yl)-4,6-dibromo-s-triazine

The compound of Example 10 (9.3 g., 0.04 mole) was refluxed for five hours in ethanol (200 ml.) and concentrated hydrochloric acid (5 ml.). On cooling to room temperature, the 4,6-dioxo compound was precipitated in 95 to 100 percent yield.

The 2-(thien-2'-yl)-4,6-dioxo-s-triazine so obtained (2.93 g., 0.015 mole) phosphorus tribromide (8.9 g., 0.033 mole) bromine (5.3 g., 0.033 mole) and phosphoryl bromide (26 g., 0.090 mole) were well mixed together, and then heated with efficient stirring under a water condenser and a moisture guard tube. The mixture was quickly heated to 80° C., then slowly heated up to 120° C. over one hour, and finally maintained at 120° C. for at least five hours.

The reddish-colored liquid was allowed to cool down to about 50° C. and then poured slowly into well stirred crushed ice (about 30 g.). The whole was vigorously stirred until the waxy mass of product had changed into a discrete solid. The suspension was filtered at the pump and the solid was dried in vacuo at room temperature in a dessicator.

The solid was purified by repeated crystallizations from a mixture of carbon tetrachloride and petroleum ether 60°–80° C. (1:2 vol.); colorless long needles, m.p. 187° C., yield 0.45 g.

The identical product was obtained by carrying out the reaction of Example 10 using cyanuric bromide.

EXAMPLE 15

By the methods described in Examples 5 to 13, cyanuric chloride was reacted with the appropriate heteroaromatic compound to produce the following compounds:

2-(1'-isopropylpyrrol-2'-yl)-4,6-dichloro-s-triazine, m.p. 118° – 119° C.

2-(fur-2'-yl)-4,6-dichloro-s-triazine, m.p. 106° C.

2-(3'-methylthien-2'-yl)-4,6-dichloro-s-triazine, m.p. 170° C.

2-(5'-ethylthien-2'-yl)-4,6-dichloro-s-triazine, m.p. 67° C.

2-(4'-methylthien-2'-yl)-4,6-dichloro-s-triazine, m.p. 144° C.

2-(5'-methoxythien-2'-yl)-4,6-dichloro-s-triazine, m.p. 107° C.

2-(1'-ethylpyrrol-2'-yl)-4,6-dichloro-s-triazine, m.p. 115° C.

2-(5'-methylfur-2'-yl)-4,6-dichloro-s-triazine, m.p. 94° – 95° C.

2-(5'-acetylthien-2'-yl)-4,6-dichloro-s-triazine, m.p. 152° C.

2-(3'-methoxythien-2'-yl)-4,6-dichloro-s-triazine, m.p. 208° – 210° C.

2-('-n-butylpyrrol-2'-yl)-4,6-dichloro-s-triazine, m.p. 44° – 46° C.

2-(1'-phenylpyrrol-2'-yl)-4,6-dichloro-s-triazine, m.p. 160° – 163° C.

2-(1',5'-dimethylpyrrol-2'-yl)-4,6-dichloro-s-triazine, m.p. 170° C.

2-(1'-phenylindol-3'-yl)-4,6-dichloro-s-triazine, m.p. 194° – 196° C.

2-(1'-benzylpyrrol-2'-yl)-4,6-dichloro-s-triazine, m.p. 125° – 127° C.

2-(indol-3'-yl)-4,6-dichloro-s-triazine, m.p. 250° – 252° C.

2-(5'-methylpyrrol-2'-yl)-4,6-dichloro-s-triazine, m.p. 208° – 209° C.

In addition to the method described in Example 4, the compounds produced by the process of Examples 5 to 15 may also be nitrated as follows:

EXAMPLE 16

2-(4'-Nitrothien-2'-yl)-4,6-dichloro-s-triazine 2-(Shien-2'-yl)-4,6-dichloro-s-triazine (5.75 g., 0.025 moles) was added portionwise to a 4:1 volume mixture of concentrated sulphuric and nitric acids (25 ml.) keeping the temperature between 25° and 35° C. After the addition, it was briefly heated to 50° – 60° C., then cooled, and carefully poured on to crushed ice with stirring. After one hour, the product was filtered off and dried at 100° C. This product is 2-(4'-nitrothien-2'-yl)-4,6-dioxo-s-triazine, m.p. 312° – 314° C. (dec.) after crystallization from dimethylformamide.

It was chlorinated, using phosphorus pentachloride and phosphorus oxychloride, as in Example 1, to give the desired product, m.p. 186° – 187° C. after recrystallization from 10:1 volume hexane:chloroform mixture.

In the same manner 2-(5'-ethyl-4'-nitrothien-2'-yl)-4,6-dichloro-s-triazine, m.p. 150° C., was prepared.

EXAMPLE 17

2-(1'-Methyl-4'-nitropyrrol-2'-yl)-4,6-dichloro-s-triazine 2-(1'-Methylpyrrol-2'-yl)-4,6-dichloro-s-triazine (9.2 g., 0.04 mole) was hydrolyzed to the dioxo-compound by refluxing for five hours with ethanol (200 ml.) and concentrated hydrochloric acid (5 ml.). The solution was cooled to 0° C. and the product filtered off and dried.

This dioxo-compound (5.75 g., 0.03 mole) was added portionwise to a mixture of water (10 ml.) conc. sulphuric acid (24 ml.) and conc. nitric acid (3.5 ml.) at a temperature of 25° – 30° C. with stirring. After a further 45 minutes the mixture was tipped on to crushed ice, stirred for one hour and the product filtered off and dried. This is 2-(1'-methyl-4'-nitropyrrol-2'-yl)-4,6-dioxo-s-triazine, m.p. 331° – 332° C. after crystallization from dimethylformamide.

Chlorination, as in Example 1, gave the desired 4,6-dichloro-compound, m.p. 179° C. after several recrystallizations from a 10:1 volume mixture of hexane and chloroform.

Similarly 2-(5'-nitrofur-2'-yl)-4,6-dichloro-s-triazine, m.p. 166° – 168° C., was prepared.

The following Examples illustrate formulations containing an active ingredient of formula I:

EXAMPLE 18

A wettable powder containing the following ingredients was prepared:

| | % by weight |
|---|---|
| 2-(1'-methylpyrrol-2'-yl)-4,6-dichloro-s-triazine | 40 |
| sodium lauryl sulphate - anionic surfactant | 6 |
| isooctyl phenyl polyethoxy ethanol - nonionic emulsifier/dispersant | 9 |
| china clay | 45 |

In use, this wettable powder concentrate is diluted with water to form a spray composition containing from 400 to 800 p.p.m. of active ingredient.

EXAMPLE 19

A wettable powder containing the following ingredients was prepared:

| | % by weight |
|---|---|
| 2-(1'-phenylpyrrol-2'-yl)-4,6-dichloro-s-triazine | 80 |
| dioctyl ester of sodium sulphonuccinic acid — anionic surfactant | 10 |
| kaolin | 10 |

In use, this powder is dispersed in water to form a spray composition containing from 600 to 1000 p.p.m. of active ingredient.

EXAMPLE 20

An emulsifiable concentrate containing the following ingredients was prepared:

| | % by weight |
|---|---|
| 2-(4'-methylthien-2'-yl)-4,6-dichloro-s-triazine | 20 |
| sodium alkyl aryl sulphonate blend — emulsifier | 6 |
| polyoxyethylene sorbitan monolaurate — nonionic emulsifier | 5 |
| xylene | 69 |

This composition is diluted prior to use with water to form a sprayable emulsion containing from 200 to 600 p.p.m. of active ingredient.

We claim:

1. Compound of the formula:

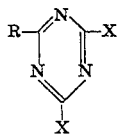

I wherein X is halogen and R is a pyrrolyl or indolyl group linked through a carbon atom to the triazine ring, said pyrrolyl or indolyl group being optionally substituted on the nitrogen by lower alkyl, lower alkenyl, hydroxy(lower)alkly, carboxy(lower)alkyl or phenyl and optionally substituted at one or more ring carbon atoms by lower alkyl, lower alkoxy, lower acyl, phenyl, nitro, amino or halogen, the term "lower" used in qualifying the above substituents meaning that those groups contain up to six carbon atoms.

2. Compound according to claim 1, wherein R is selected from the following structures:

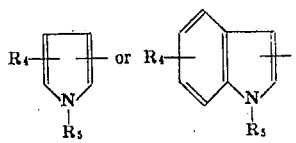

where $R_4$ is hydrogen, methyl, methoxy, acetyl, nitro, amino, chlorine or bromine, and $R_5$ is hydrogen, $C_{1-4}$ alkyl, vinyl, hydroxyethyl, carboxyethyl, benzyl or phenethyl.

3. Compound as claimed in claim 1, said compound being a 2-(1'-alkyl-pyrrol-2'-yl)-4,6-dichloro-s-triazine.

4. Compound as claimed in claim 1, said compound being 2-(1'-methylpyrrol-2'-yl)-4,6-dichloro-s-triazine.

5. Compound as claimed in claim 1, said compound being 2-(pyrrol-2'-yl)-4,6-dichloro-s-triazine.

6. Compound as claimed in claim 1, said compound being 2-(1'-ethylpyrrol-2'-yl)-4,6-dichloro-s-triazine.

* * * * *